United States Patent Office 3,480,254
Patented Nov. 25, 1969

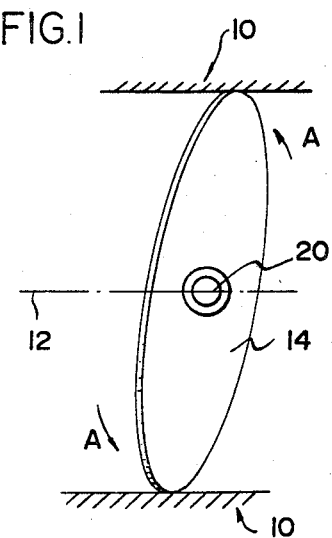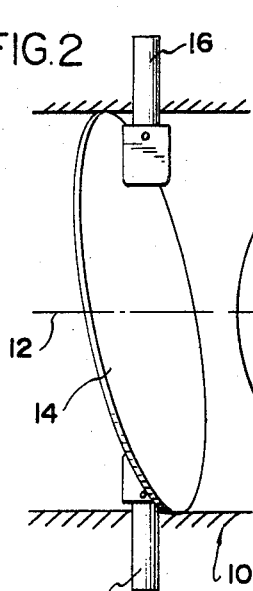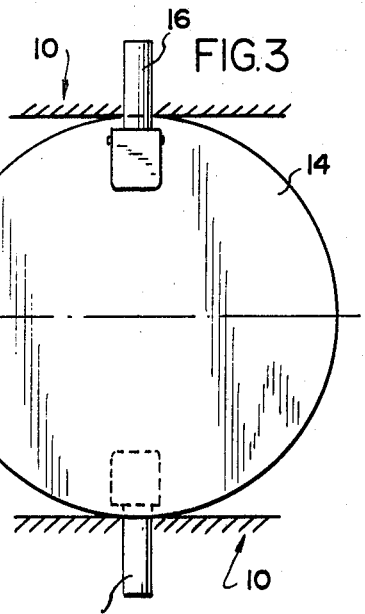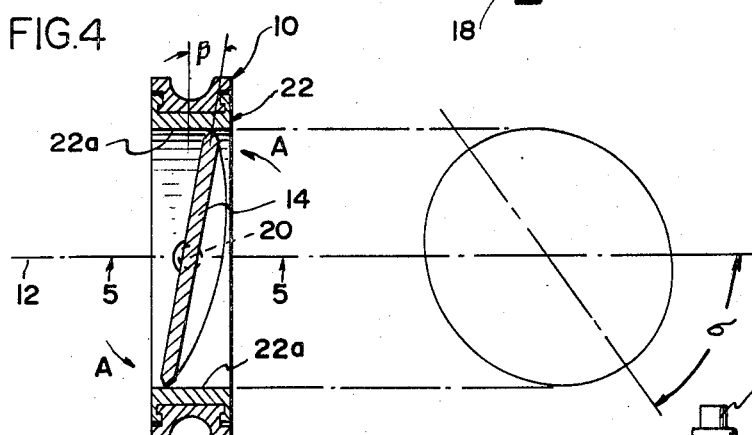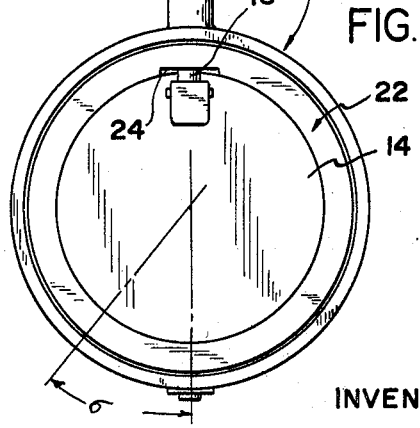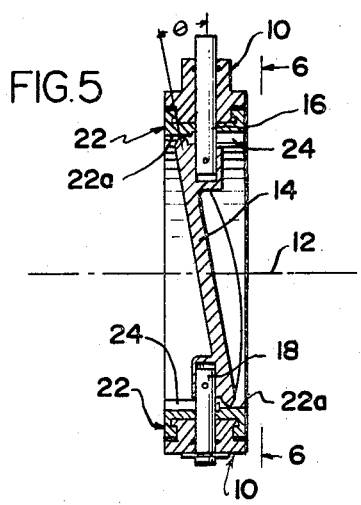
INVENTOR.
DONALD G. FAWKES
BY Hofgren, Wegner, Allen, Stellman & McCord.
ATTORNEYS.

3,480,254
ANGLE SEATING BUTTERFLY VALVE WITH SKEWED DISC
Donald G. Fawkes, Aurora, Ill., assignor to Henry Pratt Company, a corporation of Delaware
Filed Feb. 12, 1968, Ser. No. 704,691
Int. Cl. F16k 1/22, 5/04
U.S. Cl. 251—305                                  7 Claims

ABSTRACT OF THE DISCLOSURE

A butterfly valve in which a valve housing has a longitudinal center line and means defining an elliptical cylindrical valve seat surface which has a center line coincident with the housing center line. A closure disc is pivotally mounted in the housing about a shaft axis perpendicular to the housing center line. The disc has a circular periphery in a plane angularly offset relative to the shaft axis so that the shaft axis passes through the plane of the disc. The plane formed by the disc periphery in valve closed position is skewed to a plane perpendicular to the housing center line.

Background of the invention

As disclosed in my copending application Ser. No. 573,518, I have discovered a means of providing a novel elliptical cylindrical butterfly valve seat in which the mating parts of a circular closure disc and valve housing are so arranged that the closure is in effect lifted out of the elliptical cylindrical seat of the valve upon movement toward opening from fully closed position. The elliptical cylindrical valve seat surface disclosed therein has a center line which extends at an acute angle to the center line of the fluid passage. The closure disc in its closed position is offset and parallel to the shaft on which the disc is mounted for movement of approximately 90 degrees between valve open and the valve closed positions.

I have found that in certain situations it would be desirable to employ the concept of seating a circular closure disc onto an elliptical cylindrical seat surface such that the manufacturing tolerances and the amount of wear during normal use of the valve is much less critical and can be compensated for by adjusting the amount of travel of the disc at the valve operator rendering the construction much less expensive and easier to manufacture. The valve of this invention employs a butterfly valve housing with a generally circular cylindrical bore about a center line providing a fluid passage through the housing. A valve seat surface is formed in the housing and has the shape of a section of an elliptical cylinder about a center line which is coincident with the center line of the housing. A closure member, a disc, is pivotally mounted in the housing for movement of approximately 90 degrees between valve open and closed positions and is so oriented that the plane formed by the periphery of the disc is angularly offset relative to the shaft axis, the shaft axis passes through the plane of the disc and is perpendicular to the center line of the housing, and the plane formed by the disc periphery in valve closed position is skewed to a plane including the shaft axis and the housing center line. This orientation provides for angular seating of the circular closure disc onto the elliptical cylindrical valve seat relative to a plane perpendicular to the housing center line, referred to herein as the disc seating angle. With such a structure, the setting on the valve operator can be changed to vary the disc's seating angle to allow the disc to seat tighter onto the seat surface if necessary. Such adjustment is not available when the disc is fixed in a perpendicular disposition across the fluid passage when in closed position.

SUMMARY OF THE INVENTION

The principal object of this invention is to provide a new and improved valve.

Another object of this invention is to provide a new and improved butterfly valve seat structure and closure disc in which the disc is skewed relative to its shaft and the disc seats at a skewed angle to the plane perpendicular to the flow center line through the valve housing.

A further object of this invention is to provide a novel valve structure wherein the closure disc may easily be adjusted to compensate for manufacturing tolerances and wear caused in normal use of the valve.

More particularly, the principal feature of this invention which carries with it the above objects and advantages to be found in some elliptical cylindrical valve seats is the provision of a circular closure disc so arranged that the disc is wedged onto the seat when closing the valve and is in effect lifted out of the seat of the valve upon movement toward opening from fully closed position, the closure disc being angularly offset in relation to the shaft axis and the housing center line.

Further objects, features and advantages of the invention will be apparent from the following detailed description and the accompanying drawings.

DESCRIPTION OF THE DRAWINGS

FIGURE 1 is a diagrammatic sectional view through the valve housing normal to the valve shaft and illustrating a top plan view of the closure disc in its closed position;

FIGURE 2 is a diagrammatic sectional view through the valve housing illustrating in side elevation the valve in its closed position;

FIGURE 3 is a diagrammatic sectional view similar to that of FIGURE 2 illustrating in side elevation the closure disc in its fully open position;

FIGURE 4 is a central sectional view through the valve housing, valve seat and closure disc, with an exaggerated development of the elliptical cylindrical valve seat surface as intersected by a plane perpendicular to the elements or generatrix of such surface;

FIGURE 5 is a central sectional view taken generally along the line 5—5 of FIGURE 4; and FIGURE 6 is an end elevational view taken generally in the direction of line 6—6 in FIGURE 5.

DETAILED DESCRIPTION OF THE INVENTION

The present invention is generally concerned with a butterfly valve and is illustrated in a form including a valve housing shown generally at 10 having a fluid passage therethrough about a longitudinal center line 12 (FIGURES 4 and 5) which will coincide usually with the center line of piping in which the valve is installed. The valve housing 10 is appropriately shaped to mate with suitable piping or other equipment and may be formed of various cast metals or of fabricated materials economical and suitable for use in the particular service for which the valve is intended.

A valve closure disc 14 is rotatably mounted in the housing 10 on stub shaft sections 16 and 18 which have a common axis normal to the fluid passage center line 12. The shaft section 16 is journaled in the housing and extends upwardly therethrough for connection to an appropriate valve operator (not shown in the drawings). The shaft section 18 is journaled in the housing diametrically opposite shaft section 16 and has appropriate bearing means to permit easy rotation of the closure disc 14. The closure disc is circular and is angularly offset relative to the shaft axis 20 (FIGURES 1 and 4) so ing means to permit easy rotation of the closure disc as best seen in FIGURES 1 and 5. The disc thus has a continuous 360 degree sealing periphery. The angle between the stub shaft center line and the plane of the disc is referred to herein as the skewed disc angle.

As best seen in FIGURES 2 and 4, the disc, in its closed position, is also skewed relative to a plane perpendicular to the center line of the fluid passage 12 such that the plane formed by the periphery of the disc is at an acute (or skewed) angle to the plane perpendicular to the fluid passage center line 12. The angle of skew just described is referred to as the skew angle of seating of the disc.

The valve seat is designated generally 22 (FIGURES 4 through 6) and extends continuously about the interior of the valve housing 10 and is sufficiently wide to provide a seating surface on both sides of the shaft sections 16 and 18 for contact with the periphery of the angularly offset closure disc 14. The operative surface of the valve seat is an inwardly facing elliptical cylindrical surface 22a for cooperatively contacting the periphery of the closure disc 14 to close the valve when the disc is in its closed position as illustrated in FIGURES 4 through 6.

As disclosed in my aforementioned copending application, the intersection of an elliptical cylindrical surface by a flat plane passing through the cylinder at an appropriate angle to the cylinder's elements, produces a circle. The present valve structure makes use of this principle in mating the elliptical cylindrical valve seat with the angularly oriented circular closure disc. FIGURE 4 illustrates an exaggerated development of the elliptical cylindrical valve seat surface.

In order to fully comprehend the manner in which the novel closure disc 14 may be seated onto the elliptical cylindrical surface 22a, permitting the disc to be wedged onto and lifted off of the valve seat rather than sliding thereon when moved between its colsed and open positions, it should be understood that if the closure disc would be merely angularly offset in relation to the shaft axis (as illustrated by the section through the disc in FIGURE 5) the disc would cooperatively contact the elliptical surface but would slide onto the valve seat, and the seal would be accomplished only by the displacement of the rubber seat. But by controlling the dimensions of the circular closure disc and the elliptical cylindrical valve seat, the above described angular or skewed seating of the disc can be accomplished as illustrated in FIGURES 1 and 4. As the disc rotates in the direction of arrows A (FIGURES 1 and 4) toward its closed position, the disc actually wedges onto the valve seat rather than sliding thereon when moved from its open position to its closed position.

In essence, it is the skewed disc angle, as illustrated in FIGURE 5, which permits the circular disc to cooperatively contact the inwardly facing surface of the elliptical cylindrical valve seat in its closed position. But it is the skewed angle of seating of the disc onto the seat surface, as illustrated in FIGURES 2 and 4, which permits the disc to wedge onto and off of the valve seat.

With this novel construction, the manufacturing tolerances and the wear caused during the normal use of the valve are much less critical. By simply moving the valve operator setting, the valve disc can be seated tighter onto the valve in the direction of arrows A (FIGURES 1 and 4) to compensate for either wear or manufacturing tolerances. Obviously, by reducing the manufacturing tolerances such a valve is cheaper and easier to manufacture.

In addition, the elliptical cylindrical valve seat itself is easier to form when the axis of the ellipse is on line with the fluid passage center line 12. The seat is easily molded of rubber and the thickness thereof can simply be varied (for instance $3/16$ of an inch) to take up the difference between the circular housing 10 and the elliptical cylindrical surface of the seat such that the circular closure disc 14 seats securely onto the seating surface 22a. Such a construction facilitates a molded in place-seat, where a mold is machine tooled to the proper shape and the seat is mass produced and molded directly onto the housing 10. The mold can easily be removed from within the housing since the axis of the cylinder is on line with the fluid passage center line 12.

Once the desired disc seating angle and the skew angle of the disc are selected, the dimensions of the elliptical cylindrical seat are easily geometrically determined by standard engineering calculations. For instance, Let:

$\alpha$ = angle of opening
$\beta$ = disc seating angle (see FIGURE 4)
$\theta$ = disc skew angle (see FIGURE 5)
$\phi$ = angle between the plane of the disc and the valve ¢ 12
$\sigma$ = angle between the major axis of the elliptical seat and the shaft ¢ 20 (see FIGURE 6)
$R$ = radius of the disc perimeter Then $$\phi = \arccos \frac{\sqrt{(R \sin \theta)^2 + (R \cos \theta \sin \beta)^2}}{R}$$

$$\theta = \arccos \sqrt{\sin^2 \theta + \cos^2 \theta \sin^2 \beta}$$

and $$\sigma = \arctan \frac{R \cos \theta \sin \beta}{R \sin \theta}$$

$$\sigma = \arctan \frac{\cos \theta \sin \beta}{\sin \theta}$$

Therefore, if the desired seating angle $\beta$ and the desired skew angle $\theta$ are each selected to be 10°, then $$\phi = \arccos \sqrt{(.1736)^2 + (.9848)^2(.1736)^2} = 75°54'$$

and $$\sigma = \arctan \frac{(.9848)(.1736)}{(.1736)} = 44°34'$$

Also, the minor axis of the ellipse $R'$ is calculated by: $R' = R \cos \theta$, and if $R = 6$, the minor axis $R' = 5.819$.

As seen in FIGURES 5 and 6, a portion of the valve seat is cut out forming reliefs 24 adjacent the stub shaft sections 16 and 18. These cut out portions of the valve seat surface accommodate the peripheral portions of the closure disc adjacent the valve shaft sections. Since the disc is angularly offset relative to the common axis of the shaft sections, these peripheral portions of the closure disc rotate, on movement from open and closed positions, in a circled spaced from the shaft sections and the valve seat surface would interfere with the disc movement if such reliefs 24 are not provided.

While this invention is susceptible of embodiment in many different forms, there is shown in the drawings and has herein been described in detail one embodiment of the invention, with the understanding that the present disclosure is to be considered as an exemplification of the principles of the invention and is not intended to limit the invention to the embodiment illustrated. The scope of the invention will be pointed out in the appended claims.

I claim:
1. A butterfly valve, comprising: a valve body having a longitudinal center line along a flow path through the valve; shaft means across the body on an axis normal to its center line; a closure disc mounted for rotation upon the shaft means in the body, said disc having a circular periphery in a plane angularly offset relative to the shaft axis so that the shaft axis passes through the plane of the disc, and the plane formed by the disc periphery in valve closed position being skewed to a plane perpendicular to the body center line; and means forming a valve seat surface around the interior of the valve body in position to be contacted by the periphery of the closure disc in valve closed position, said surface being a section of an elliptical cylinder having an axis coincident with the body center line.

2. The butterfly valve of claim 1 wherein the valve seat surface formed by said section of the elliptical cylinder is of generally constant width between two parallel planes perpendicular to the generatrix and elements of the elliptical cylinder of which such surface is a section.

3. The butterfly valve of claim 2 wherein said parallel planes are oblique to said closure disc when in its closed position.

4. The butterfly valve of claim 1 wherein the valve seat surface formed by said section of the elliptical cylinder is positioned such that the major axis of the elliptical cylinder is oblique to said shaft means.

5. The butterfly valve of claim 1 wherein inwardly facing surface portions of said elliptical cylindrical surface adjacent the shaft means are relieved to accommodate the peripheral edge of said closure disc adjacent said shaft means when the disc moves between open and closed positions.

6. The butterfly valve of claim 1 wherein said valve seat has a continuous inwardly facing surface through which said shaft means extend, said seat being of sufficient width to provide a seating surface for said angularly offset closure disc.

7. A butterfly valve, comprising: a valve housing having a longitudinal center line; means defining an elliptical cylindrical valve seat surface in said housing, the center line thereof being coincident with the housing center line; and a closure disc pivotally mounted in said housing about an axis perpendicular to said center line, said disc having a circular periphery in a plane skewed to a plane perpendicular to said center line, said closure disc extending across said valve seat surface to close the valve and being swingable approximately 90 degrees away from said valve seat surface to open the valve, said disc periphery and valve seat surface having complementary contacting surfaces in valve closed position.

References Cited

UNITED STATES PATENTS

| 612,362 | 3/1899 | McElroy | 251—306 XR |
| 813,771 | 2/1906 | Bush | 251—306 XR |
| 1,624,891 | 4/1927 | Hutchinson et al. | 251—307 |
| 2,011,641 | 8/1935 | Kruse | 251—305 XR |
| 3,000,609 | 9/1961 | Bryant | 251—306 |

FOREIGN PATENTS

| 583,610 | 9/1933 | Germany. |

HENRY T. KLINKSIEK, Primary Examiner